United States Patent
Aulin

(10) Patent No.: US 8,125,883 B2
(45) Date of Patent: Feb. 28, 2012

(54) OFDM IN FAST FADING CHANNEL

(76) Inventor: Jocelyn Aulin, Västra Frölunda (SE)

(\*) Notice: Subject to any disclaimer, the term of this patent is extended or adjusted under 35 U.S.C. 154(b) by 462 days.

(21) Appl. No.: 11/688,169

(22) Filed: Mar. 19, 2007

(65) Prior Publication Data

US 2007/0286063 A1  Dec. 13, 2007

Related U.S. Application Data

(60) Provisional application No. 60/783,058, filed on Mar. 17, 2006.

(51) Int. Cl.
*H04J 11/00* (2006.01)

(52) U.S. Cl. ...................................................... 370/203

(58) Field of Classification Search .................. 370/203
See application file for complete search history.

(56) References Cited

U.S. PATENT DOCUMENTS

| | | | | |
|---|---|---|---|---|
| 5,671,221 | A * | 9/1997 | Yang | 370/320 |
| 6,154,489 | A | 11/2000 | Kleider et al. | |
| 6,781,951 | B1 * | 8/2004 | Fifield | 370/203 |
| 2001/0055320 | A1 * | 12/2001 | Pierzga et al. | 370/480 |
| 2002/0114270 | A1 * | 8/2002 | Pierzga et al. | 370/208 |
| 2003/0156534 | A1 * | 8/2003 | Coulson et al. | 370/210 |
| 2004/0170228 | A1 * | 9/2004 | Vadde | 375/260 |
| 2005/0243943 | A1 * | 11/2005 | Stirling-Gallacher | 375/267 |
| 2006/0028977 | A1 * | 2/2006 | Izumi | 370/203 |
| 2006/0141933 | A1 * | 6/2006 | Smee et al. | 455/63.1 |
| 2006/0229017 | A1 * | 10/2006 | Larsson et al. | 455/63.1 |

OTHER PUBLICATIONS

Attenborough, Mary. Mathematics for Electrical Engineering and Computing. 2003.*
X. Cai and G. Giannakis, "Bounding Performance and Suppressing Intercarrier Interference in Wireless Mobile OFDM," IEEE Transactions on Communications, vol. 51, pp. 2047-2056, Dec. 2003.
P. Chen and H. Kobayashi, "Maximum Likelihood Channel Estimation and Signal Detection for OFDM Systems," in IEEE International Conference on Communications, 2002. ICC2002, vol. 3, pp. 1640-1645, Apr. 2002.
Y. Choi, P. Voltz, and F. Cassara, "On Channel Estimation and Detection for Multicarrier Signals in Fast and Selective Rayleigh Fading Channels," IEEE Trans. Commun., vol. 49, pp. 1375-1387, Aug. 2001.
J. L.J. Cimini, "Analysis and Simulation of a Digital Mobile Channel Using Orthogonal Frequency Division Multiplexing," IEEE Transactions on Communications, vol. 33, pp. 665-675, Jul. 1985.
T. Cui and C. Tellambura, "Semi-blind Equalization for OFDM Systems Over Fast Fading Channels," in IEEE International Conference, 2005.
M. Doelz, E. Heald, and D. Martin, "Binary Data Transmission Techniques for Linear Systems," Proc. IRE, vol. 45, pp. 656-661, May 1957.
J. G.D. Forney, "Maximum-Likelihood Sequence Estimation of Digital Sequences in the Presence of Intersymbol Interference," IEEE Transactions on Information Theory, vol. 18, pp. 363-678, May 1972.

(Continued)

*Primary Examiner* — Jason Mattis
*Assistant Examiner* — Stephen J Clawson

(57) ABSTRACT

Detection of OFDM symbols generates an equivalent vector which represents the sufficient statistics (SS) which are subsequently processed using a maximum likelihood (ML) algorithm. The algorithms and implementations are described. Both examples of implementation using the A* (ML) algorithm and a near-ML trellis search algorithm for a time-varying finite state machine model of the received vector of SS are described.

27 Claims, 13 Drawing Sheets

OTHER PUBLICATIONS

U. Hansson and T. Aulin, "Aspects on Single Symbol Signaling on the Frequency Flat Fading Channel," IEEE Trans. Commun., vol. 47, pp. 874-883, Jun. 1999.

U. Hansson, "Efficient Digital Communication over the Time Continuous Rayleigh Fading Control", 1997, Goteborg, Sweden, pp. 1-72.

L. Kalet, "The Multitone Channel," IEEE Transactions on Communications, vol. 37, pp. 119-124, Feb. 1989.

T. Keller and L. Hanzo, "Adaptive Multicarrier Modulation: A Convenient Framework for Time-Frequency Processing in Wireless Communications," Proceedings of the IEEE, vol. 88, pp. 611-640, May 2000.

Y. Li and J. L.J. Cimini, "Bounds on the Interchannel Inreference of OFDM in Time-Varying Impairments," IEEE Transactions on Communications, vol. 49, pp. 401-404, Mar. 2001.

P. Nemeth, L. Rasmussen, and T. Aulin, "Maximum-Likelihood Detection of Black Coded CDMA Using the A* Algorithm," in Proceedings of International Symposium on Information Theory, ISIT2001, p. 88, Jun. 2001.

F. Neseer and J. Massey, "Proper Complex Random Processes with Applications to Information Theory," IEEE Transactions on information Theory, vol. 39, pp. 1293-1302, Jul. 1993.

J. Proakis, Digital Communications, 4$^{th}$ Edition. New York: McGraw-Hill Inc., 2000.

Peng Hui Tan, "Constrained Maximum-Likelihood Detection in CDMA", IEEE Transactions on Communications, vol. 49, No. 1, pp. 142-153, Jan. 2001.

H. V. Trees, Detection, Estimation and Modulation Theory Part 1. New York: John Wiley & Sons, 2001.

S.B. Weinstein and P.M. Ebert, "Data Transmissions by Frequency-Division Multiplexing Using the Discrete Fourier Transform," IEEE Transactiosn on Communication Technology, vol. COM-19, pp. 628-634, Oct. 1971.

J.M. Wozencraft and I.M. Jacobs, Principles of Communication Engineering. Prospect Heights, IL: Waveland Press, Inc., 1990.

M. Zimmerman and A. Kirsch, "The AN/GSC-10 (KATHRYN) Variable Rate Data Modem for HF Radio," IEEE Trans. Commun., vol. COM-15, pp. 197-205, Apr. 1967.

Chow, et al., "Diversity Benefits of OFDM in Fast Fading", 2006, 6 pages.

International Search Report in corresponding PCT application No. PCT/IB2007/002836 dated Feb. 28, 2008, 3 pages.

* cited by examiner

OFDM IN FAST FADING CHANNEL

I. RELATED APPLICATION

This application claims the benefit of priority of U.S. Patent Application No. 60/783,058, for "OFDM In Fast Fading," filed Mar. 17, 2006, which provisional patent application is incorporated by reference herein in its entirety.

II. TECHNICAL FIELD

The invention relates generally to communication systems and, more particularly, it relates to receivers employed in the detection of signals and the recovery of the original transmitted information within such communication systems. Such communication systems include wireless, mobile wireless, and wireline: 4th Generation Cellular, 3rd Generation cellular long term evolution, wireless local area networks (WiFi), broadband fixed wireless access networks (WiMAX), mobile broadband wireless networks (mobile WiMAX), asynchronous digital subscriber lines (ADSL, VDSL), digital video broadcasting-terrestrial (DVB-T) and its extension DVB-Handheld (DVB-H), ultra wideband (UWB), alternating current (AC) power lines.

III. BACKGROUND

Orthogonal Frequency Division Multiplexing (OFDM) is a digital transmission technique where a given channel bandwidth is divided into subchannels and individual digital signalling tones are transmitted over each subchannel concurrently in time. This transmission scheme has been an active area of research in many systems due to its resistance to multipath fading and potential for adaptive modulation where the number of tones as well as the modulation on each tone can be varied to optimize the aggregate data rate. The fact that the Discrete Fourier Transform (DFI) or Inverse Discrete Fourier Transform (IDFT), implemented using a Fast Fourier Transform algorithm, can be used to multiplex and demultiplex the signal tones was also one of the prime contributors to a high interest in this scheme.

The use of using fast IDFT/DFT circuits is very convenient from the standpoint of system implementation. These digital circuits take as input a discrete sequence in frequency/time and generates as an output a discrete sequence in time/frequency respectively. A discretization process is needed to transform the received continuous time OFDM signal waveform to a corresponding discrete signal sequence. Conventional receivers or prior art, apply direct sampling of the continuous time OFDM waveforms to generate a corresponding discrete time sequence. This is accomplished via bandpass filtering of the received signal, followed by direct sampling by an Analog-to-Digital converter (ADC). These two operations are performed with or without first down converting the received signal from Radio Frequencies (RF) to Intemediate Frequencies (IF) and/or to Baseband Frequencies (BF). After the ADC, the a Discrete Fourier Transform is performed on the received signal samples using a Fast Fourier Transform (FFT) algorithm as shown in FIG. 1.

Apparently there is no clear justification for the detection procedures where direct sampling of the received continuous time OFDM signal is performed as part of the detection process. It is well-known that the sampling procedure is lossy with respect to information. In one or more recent papers which implicitly deals with this problem, expressions are used for the demodulated signal obtained from a received OFDM signal which look very similar to those obtained by optimum detection procedures using an infinite number of samples. However, using an infinite number of samples is not feasible in practice. Furthermore, this result does not provide a set of sufficient statistics since the signal's multiplicative time process, $\gamma(t)$, is unknown and optimal filtering is not performed.

The problem of optimal signal detection has been extensively analyzed by others. In order to obtain a maximal signal-to-noise ratio (SNR) as well as the sufficient statistics such that optimality is not sacrificed, correlation receivers or matched filters, consisting of a complete set of basis functions for the received signal, must be employed at receiver's front end. If we are able to select an appropriate orthonormal basis of functions for the received OFDM signal, after optimal detection of its coordinates in the selected signal space, we are able to optimally detect the transmitted symbols carried by the OFDM signal using a Maximum Aposteriori decision rule.

Since the late 1950's, when the OFDM or Multitone transmission was invented, it was always believed that the optimal receiver is too complex to build, requiring banks of analog oscillators and banks of matched filters to de-multiplex or separate the signal tones of the received OFDM signal. For practical systems which employ 128 to 2048 signal tones, this was highly complex and costly. Thus, suboptimal receivers which employ sampling followed by FFT are considered an attractive alternative even today. The state of the art OFDM receivers today are suboptimal receivers that sample the continuous time signal and applies equalizers to remove the effects of fast fading.

IV. SUMMARY

One important aspect of the invention described here provides a method to implement the optimal receiver for an OFDM signal transmitted over a variety of channel environments such as the wireless channel, as well as the wireline channel. It encompasses all data, digital voice, digital audio and digital video applications which employ the OFDM transmission technique. The implementation method for the optimal receiver employs a discretization process which provides the set of sufficient statistics (no loss of information) derived from the received continuous time OFDM signal. A Maximum Likelihood (ML) soft-decision algorithm can be used to detect the transmitted symbols from the set of sufficient statistics. The optimal discretization process has about the same complexity as the suboptimal discretization process, but the optimal discretization process provides a significant improvement in performance. The optimal discretization process is described in detail in the section entitled Optimal Receiver Functionality.

Another important aspect of the invention is that the implicit diversity of the fast fading channel is used to provide performance gains for both the optimal and suboptimal OFDM systems. The approach used in prior art is to reverse the effects of the channel, such as the effects of time-selective fading on the transmitted signal. Contrary to prior art, the new receiver makes use of the effects of the fast fading channel to improve detection performance, in terms of increased signal-to-noise ratio or in terms of transmitted higher data rates.

Different from prior art, the new invention does not use analog-to-digial converters (ADC) to sample the received signal but employs a different method to generate a sequence that is a sufficient statistic. This sufficient statistic substantially contains all the information regarding the received continuous time waveform. Prior art, which employ ADC's, generate signal samples which are not a sufficient statistic. As a result, prior art receivers lose at least 3 decibels (dB) (or by factor of 2) in signal-to-noise power ratio over an additive white Gaussian noise channel (AWGN).

FIG. 4 is a block diagram of one implementation of a new receiver which generates the sufficient statistic, r[1],...,r[N], from the received signal, $r(t)=\Re\{\tilde{\gamma}(t)(\tilde{\chi}(t)+\sqrt{2E_b/T_s}e^{j2\pi(f_N+L/T_s)t})e^{j2\pi f_c t}\}+n_w(t)$, where $\Re\{\cdot\}$ denotes the real part of the argument. The received signal, r(t), consists of a transmitted OFDM signal $\tilde{\chi}(t)$ plus a single sinusoidal tone transmitted at frequency $f_c+f_N+L/T_s$, both of which are distorted by the fading process $\tilde{\gamma}(t)$ due to the fading channel, and by the additive white Gaussian noise process $n_w(t)$ introduced at the receiver. The sufficient statistic, $r=[r[1],\ldots,r[N]]^T$, is input to a maximum likelihood (ML) detector 208 which outputs an estimated transmitted sequence $\hat{s}$. The superscript "T" denotes vector transpose. The estimated sequence $\hat{s}$ that is selected is of the minimum Euclidean distance to the received sequence r. Different from prior art, the new receiver does not "reverse" the time-selective fading effects of the channel, but takes full advantage of the time variations to achieve the implicit diversity gain offered by the channel.

V. BRIEF DESCRIPTION OF DRAWINGS

The following figures illustrate some of the many different applications for which this invention can be used.

VI. DETAILED DESCRIPTION

Various aspects of the invention may be found in any number of devices that detect OFDM or MIMO-OFDM transmitted signals. In some instances, the OFDM symbol detection is performed on signals whose code rate and/or modulation may vary as frequently as on an OFDM symbol by symbol basis.

Diagrams of various system embodiments are provided below where any of the various aspects of the invention may be implemented. In general, any device that performs detection of OFDM signals may benefit from the invention.

Figure 1:
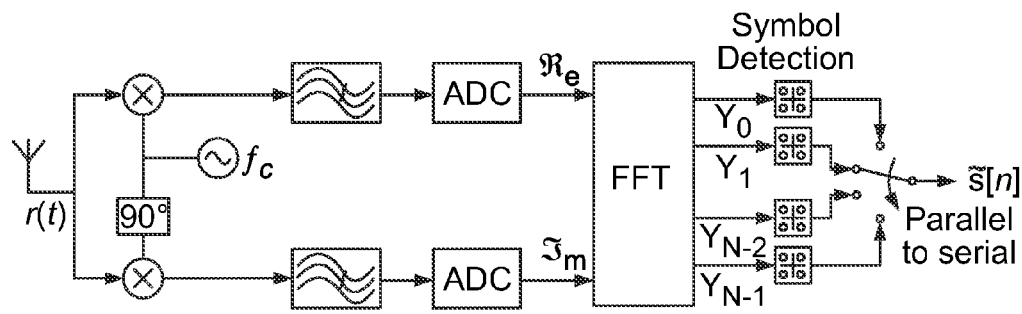
FIG. 1 is a diagram illustrating an OFDM receiver implemented according to prior art.
Figure 2:
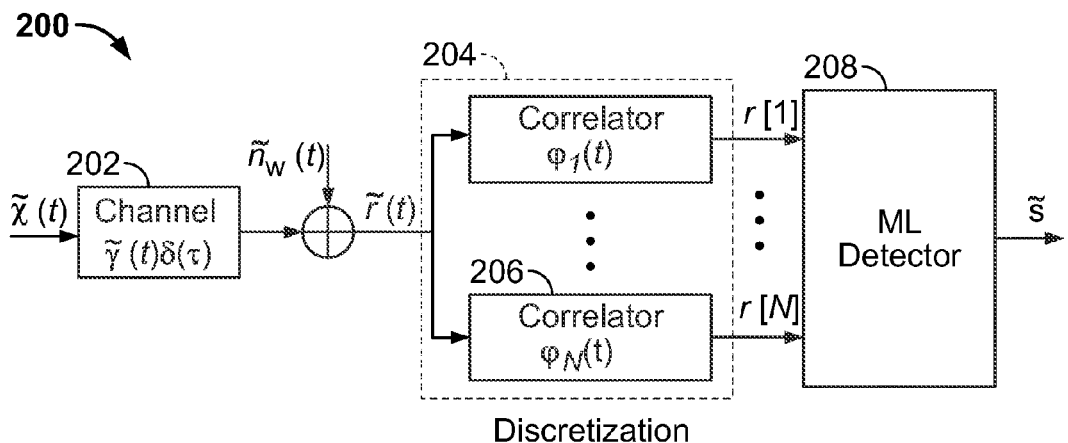
FIG. 2 is a diagram illustrating the optimal OFDM receiver implemented according to the invention.

FIG. 2 is a system diagram illustrating an embodiment of a wireless or wireline communication system that is built according to the invention. This wired or wireless network may include any number of networks including the Internet, proprietary networks, other wired networks and/or WANs (Wide Area Networks). For example, the wireless communication "channel" may be viewed as not including multiple wireless hops in one embodiment. The receiver may also be implemented using terrestrial receivers such in a multi-hop embodiment. In addition, other receivers may exist that perform receiver operations in cooperation with each other.

Figure 3:
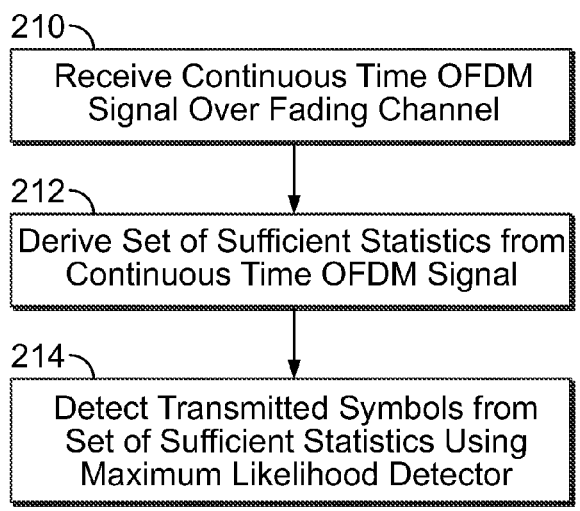
FIG. 3 is a diagram illustrating an optimal receiver process.

In some implementations, an optimal receiver process includes the steps of receiving a continuous time OFDM signal over a fading channel (210), deriving a set of sufficient statistics from the continuous time OFDM signal (212) and detecting transmitted symbols from the set of sufficient statistics using an ML detector (214) as depicted in FIG. 3.

Figure 4:
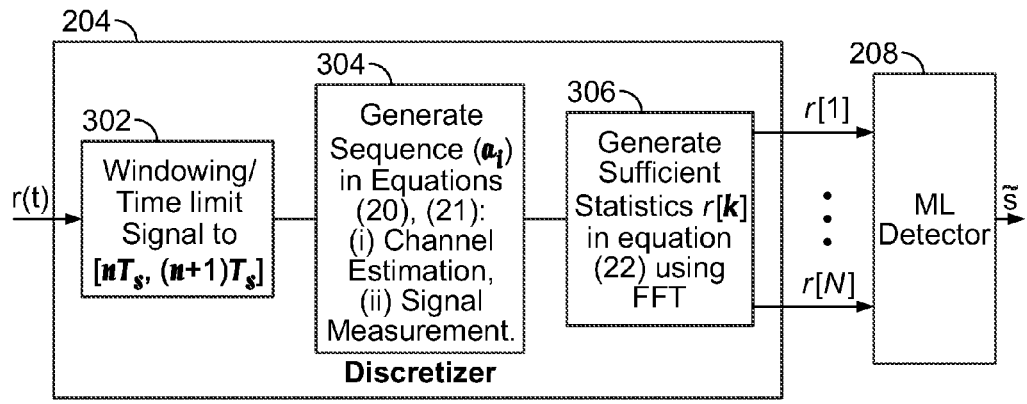
FIG. 4 is a block diagram of the Discretizer 204, also shown in FIG. 2, which generates the sufficient statistics vector r for the optimal OFDM receiver.
Figure 5:
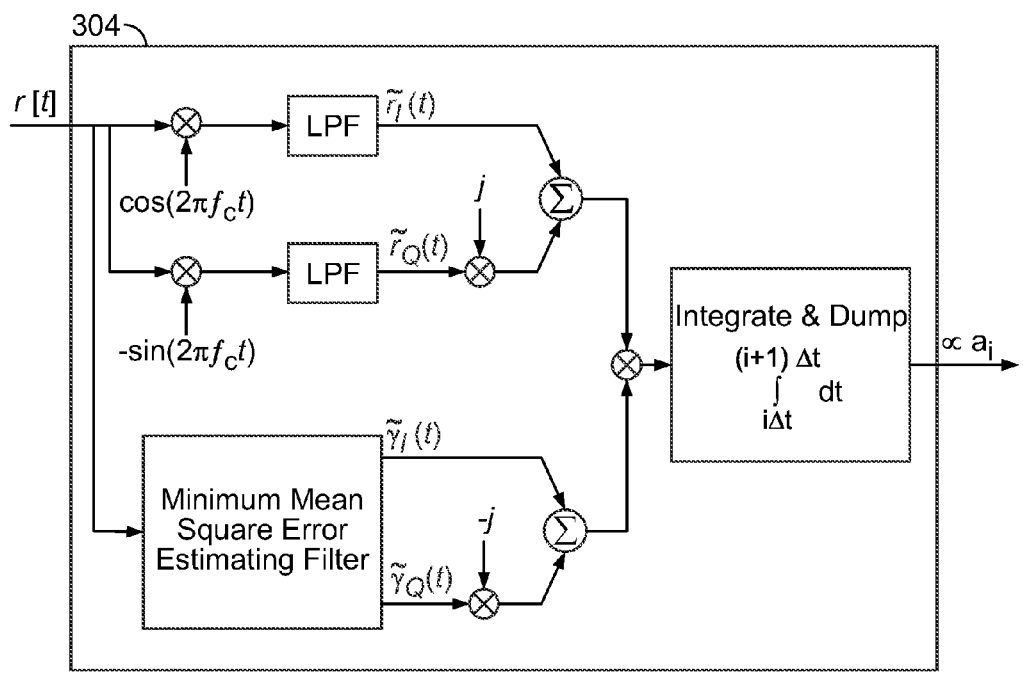
FIG. 5 is a block diagram of the Sequence Generator 304 for $\{a_i, i=0,\ldots,n-1\}$. Sequence Generator 304 also shown in FIG. 4.

FIG. 4 provides further details of the discretization process 204. The received signal r(t) is first time-limited or "windowed" by 302 to the duration of an OFDM symbol interval $[nT_s, (n+1)T_s]$, where n is an integer and designates the $n^{th}$ received OFDM symbol in the windowing function 302. This windowing function 302 is performed for each OFDM symbol received in sequence. Next, the windowed signal is processed by the sequence generator 304 to generate the sequence $a_i$, i=0, ..., n−1, defined by equations (20) and (21). In the sequence generator 304, (n−1) is defined to be (n−1)=$T_s$/Δt. Further details of a possible implementation of the sequence generator 304 is shown in FIG. 5. Subsequently, the sufficient statistics, r[k], k=1, ..., N, is generated by 306 from the input sequence $a_i$, i=0, ..., n−1 according to equation (22) which can be implemented using an FFT algorithm.

It is also noted that the methods described may also be performed within any of the appropriate system and/or apparatus designs (e.g., communication systems, communication devices, communication transceivers, communication receivers, and/or functionality described therein) that are depicted below without departing from the scope and spirit of the invention.

In view of the detailed description of the invention and associated drawings above and below, other modifications and variations will now become apparent. It should also be apparent that such other modifications and variations may be effected without departing from the spirit and scope of the invention.

A. OFDM System Model

In its simplest form, when binary signalling (BPSK) is used, the complex envelope of the transmitted OFDM signal is given by $$\tilde{x}(t) = \sum_{k=1}^{N} s[k] \frac{e^{j2\pi f_k t}}{\sqrt{T_s}} \qquad (1)$$

$$= \sum_{k=1}^{N} s[k]\phi_k(t), \; 0 \le t \le T_s, \qquad (2)$$

where $f_k = k/T_s$ is the central frequency of the kth subchannel, $T_s$ is the OFDM symbol duration interval. The data symbols $s[k]=\sqrt{E_b}b[k]$, k=1, ..., N, are all mutually independent and b[k]=±1. The total OFDM signal energy is $$E_s = \frac{1}{2}\int_0^{T_s} \tilde{x}(t)\tilde{x}^*(t)dt = NE_b. \qquad (3)$$

The OFDM signal is transmitted over a time-varying flat-fading channel and the complex envelope of the received OFDM signal can be written as $$\tilde{r}(t) = \gamma(t)\tilde{\chi}(t) + \tilde{n}_w(t), \qquad (4)$$

where γ(t) is a complex-valued Gaussian random process. The complex envelope of the additive white Gaussian noise (AWGN) has the following power spectrum $$\Phi_{\tilde{n}_w}(f) = N_0, -\infty < f < \infty \qquad (5)$$

A Karhunen-Loéve expansion can be used to characterize the received signal part $\gamma(t)\tilde{\chi}(t)$ where the eigenfunctions, $\{\phi_k(t)\}_{k=1}^{K}$, and corresponding eigenvalues, $\lambda_1, \ldots, \lambda_K$, are solutions to the integral equations $$\lambda_k \varphi_k(t) = \int_0^{T_s} C_{r,i}(t,u)\varphi_k^*(u)du, \qquad (6)$$

$$k = 1, \ldots, K,$$

where $C_{r,i}(t,u) = E[\tilde{r}(t)\tilde{r}^*(t)|\tilde{\chi}_i(t)]$, and $\tilde{\chi}_i(t)$ is one of $M=2^N$ possible OFDM waveforms. The derivation of the eigenfunctions in closed-form is not trivial for the case of Rayleigh flat-fading channel. To partially overcome this difficulty a simplified model of the Rayleigh fading channel is proposed. We assume that it's possible to make a piecewise-constant approximation of the Gaussian random process γ(t) by $\tilde{\gamma}(t)$, where $$\tilde{\gamma}(t) = \sum_{l=1}^{L} \gamma_l p_l(t), \qquad (7)$$

and where $p_l(t)=1$ for $(l-1)T_c \le t \le lT_c$ and 0 elsewhere. It is assumed that $(\gamma_1 \ldots \gamma_L)^T$ is a vector of independent and identically distributed (i.i.d.) complex-valued Gaussian random variables with zero mean and unit variance. It is also assumed $L=T_s/T_c$, where $T_c$ is the coherence time of the channel. This model is a rough approximation because it approximates a time-continuous sample function ($0 \le t \le T_s$) of the random process γ(t) by a strictly time-discontinuous, piecewise-constant function. However, it will help us to obtain some quick but important theoretical and numerical results for error performance.

VII. OFDM RECEIVER FUNCTIONALITIES

We wish to compare the error performance of an optimal receiver for the transmitted OFDM signal to that of the conventional, FFT-based, OFDM receiver. The optimality criterion for the optimal receiver is the minimum probability of OFDM symbol error. In the subsequent text, the former will be referred to as the optimal receiver and the latter as the suboptimal receiver. The receiver structures are described prior to presenting the performance analysis.

FIG. 2 shows a block diagram of the optimal receiver 200. The discretization process 204 in FIG. 2 generates the observation vector r=(r[1] ... r[N])$^T$. This vector is an input to the ML detector 208 which is described in the next section. In practice, the correlation operation 206 can be easily implemented as exemplified in FIGS. 4 and 5 using 302, 304, 306 and modern, high-speed, digital signal processors (DSPs) or field programmable gate arrays (FPGAs). The computations employed in the 306 part of the Discretizer 204 or more specifically, in the 306 aspect of the correlator 206 require basic multiplication and addition operations to perform the integration numerically.

Figure 9:
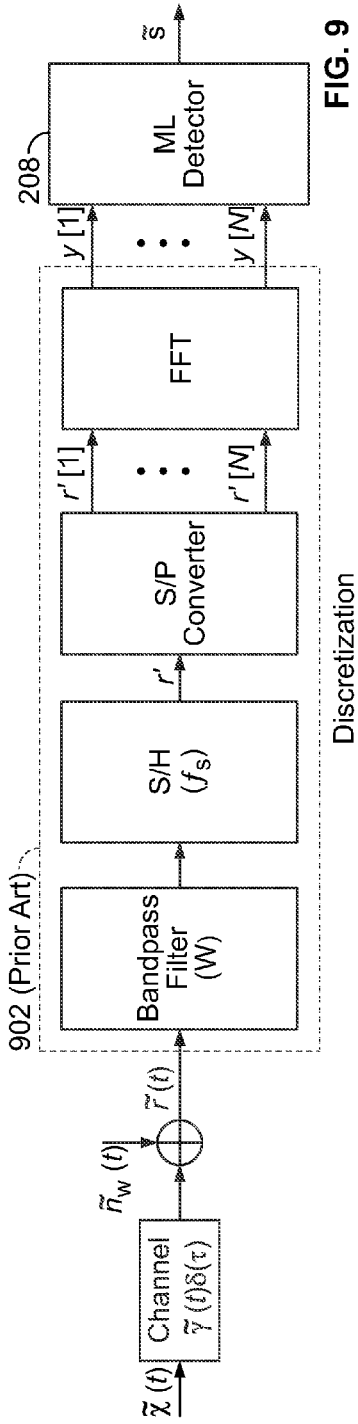
FIG. 9 is a diagram illustrating an OFDM receiver where the DISCRETIZATION is implemented according to prior art and the ML detector is implemented according to the invention ML detector 208 as shown in 2.
Figure 10:
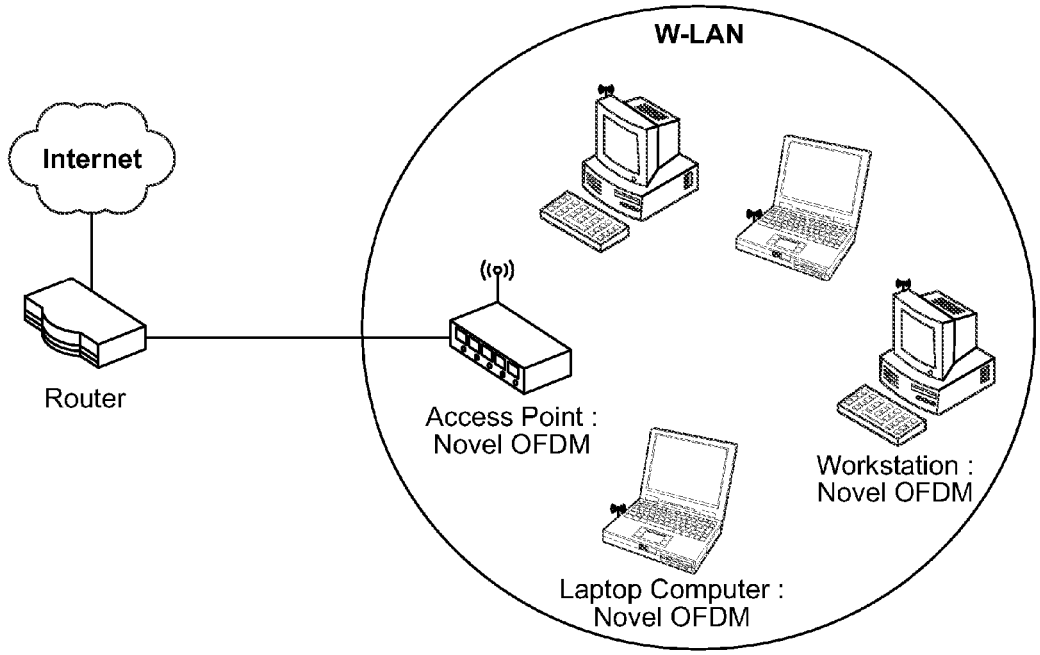
FIG. 10 is a diagram illustrating an embodiment of a WLAN (Wireless Local Area Network) that may be implemented according to the invention.
Figure 11:
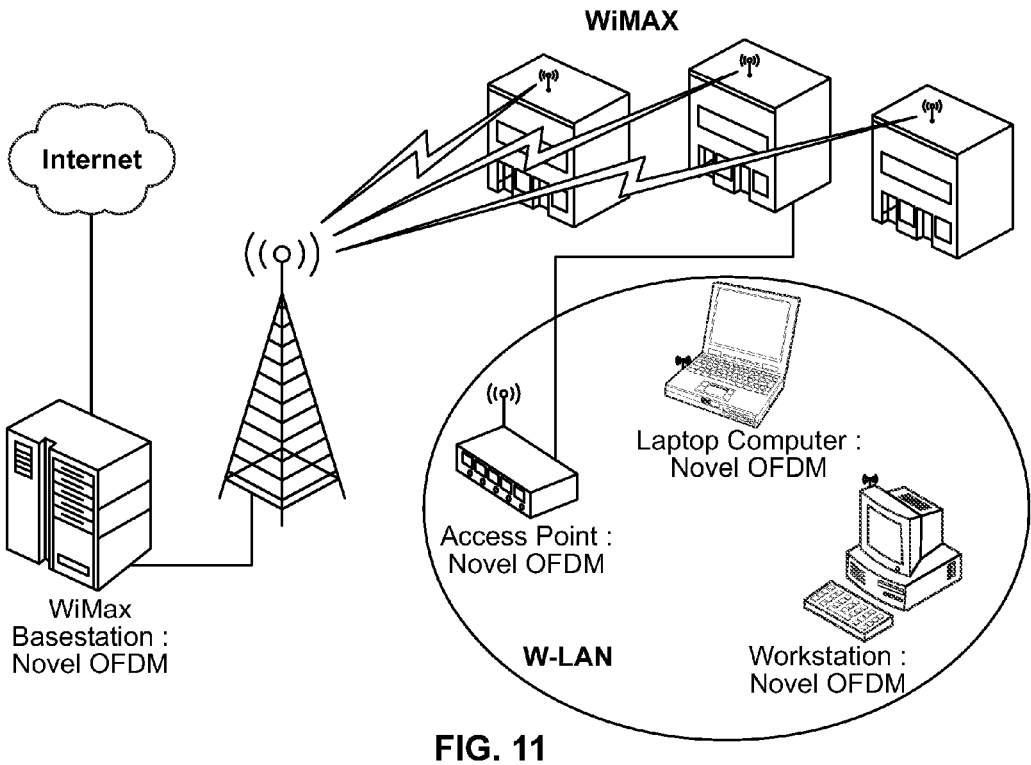
FIG. 11 is a system diagram illustrating an embodiment of a WIMAX (Worldwide Interoperability for Microwave Access) receiver system that is built according to the invention.
Figure 12:
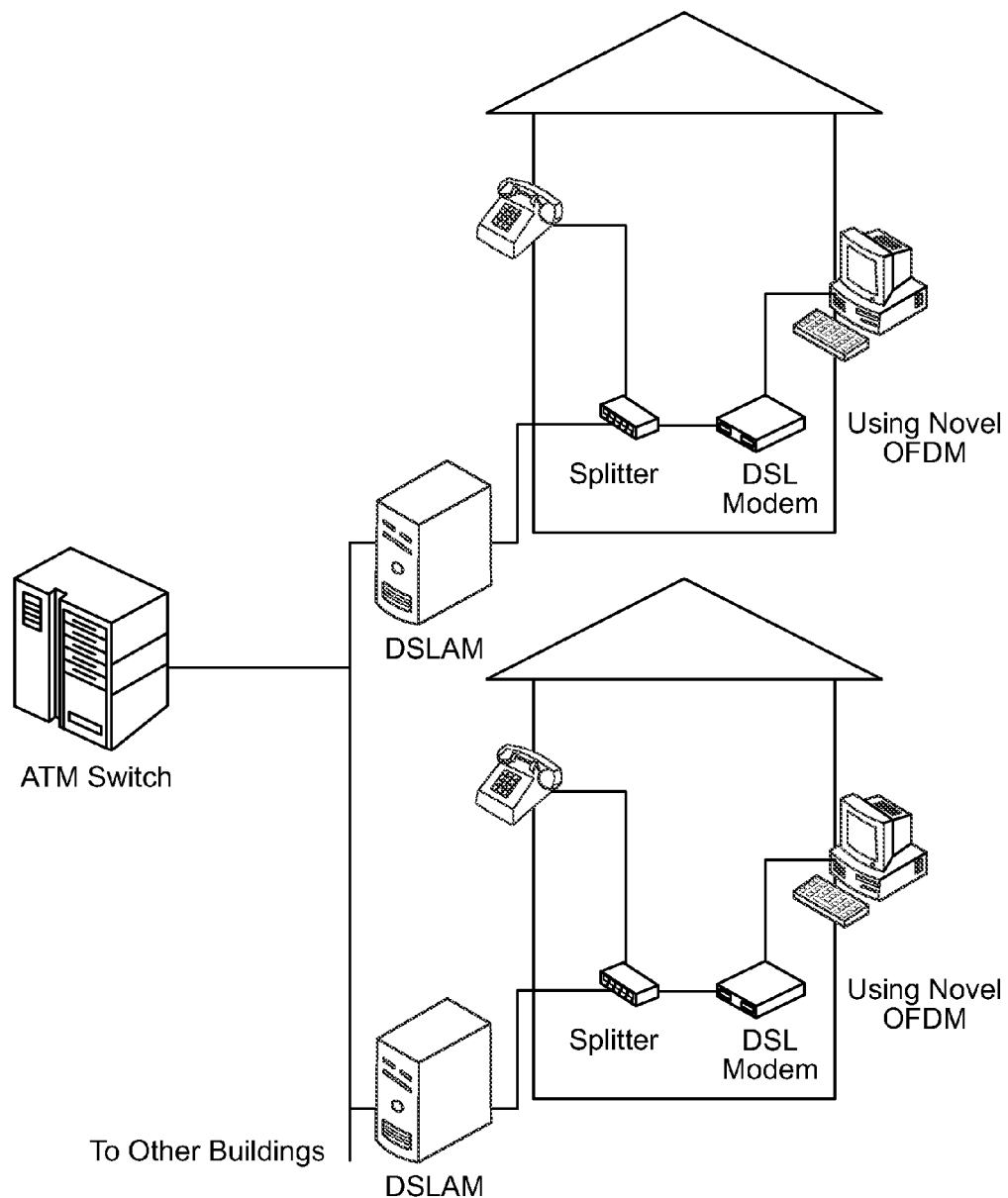
FIG. 12 is a diagram illustrating an embodiment of a DSL (Digital Subscriber Line) communication system that may be implemented according to the invention.
Figure 13:
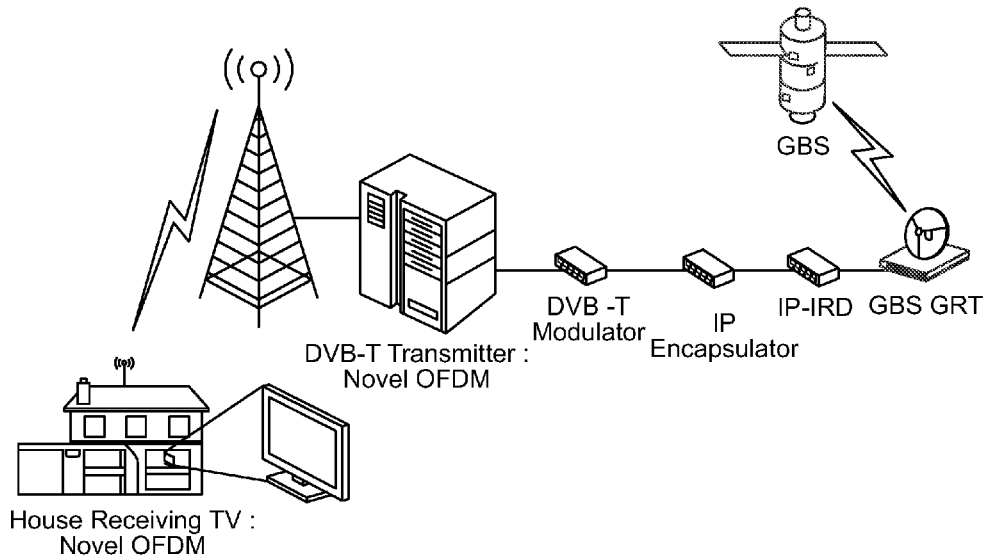
FIG. 13 is a system diagram illustrating an embodiment of a DVB-T (Digital Video Broadcasting-Terrestrial) receiver system that is built according to the invention.
Figure 14:
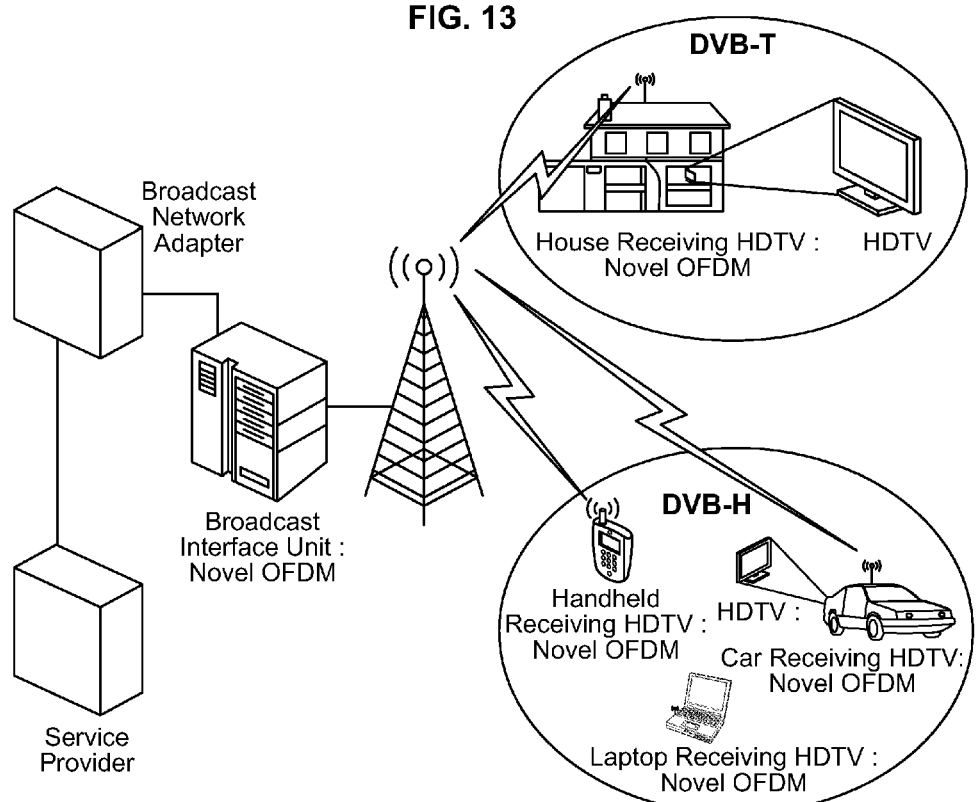
FIG. 14 is a system diagram illustrating an embodiment of HDTV (High Definition Television) broadcasting systems using DVB-T and DVB-H (Digital Video Broadcasting-Handheld) networks that are built according to the invention.
Figure 15:
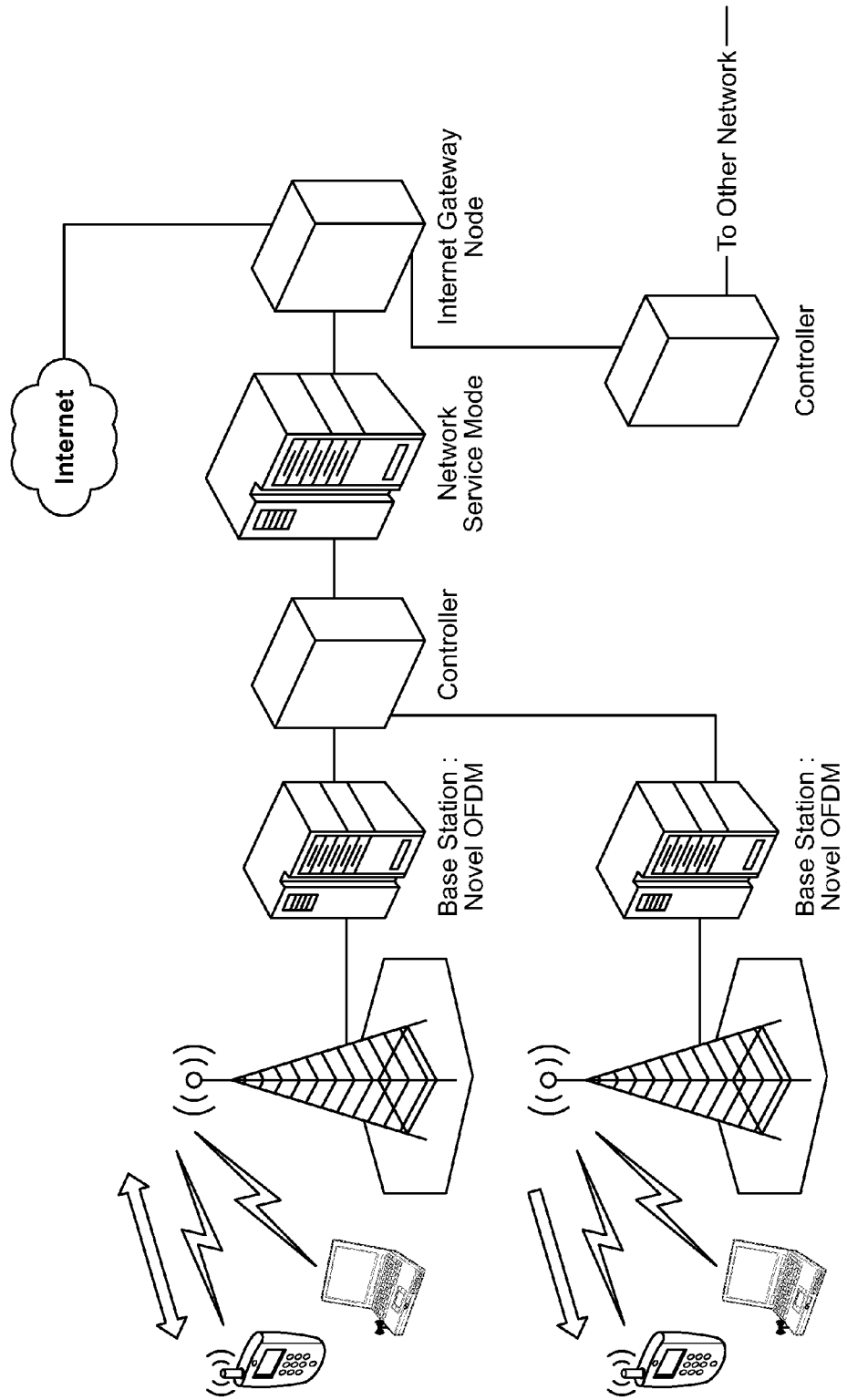
FIG. 15 is system diagrams illustrating embodiment of uni-directional and bidirectional generic cellular communication systems built according to the invention.
Figure 16:
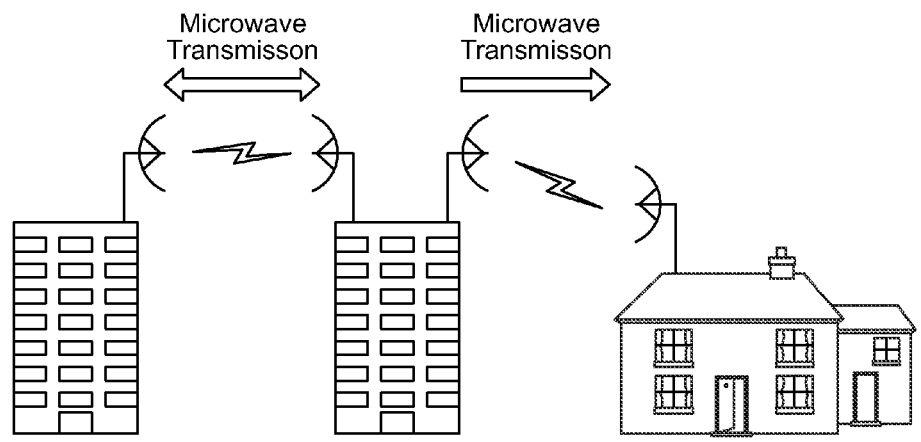
FIG. 16 is a system diagram illustrating an embodiment of a uni-directional and bi-directional microwave communication system that is built according to the invention.
Figure 17:
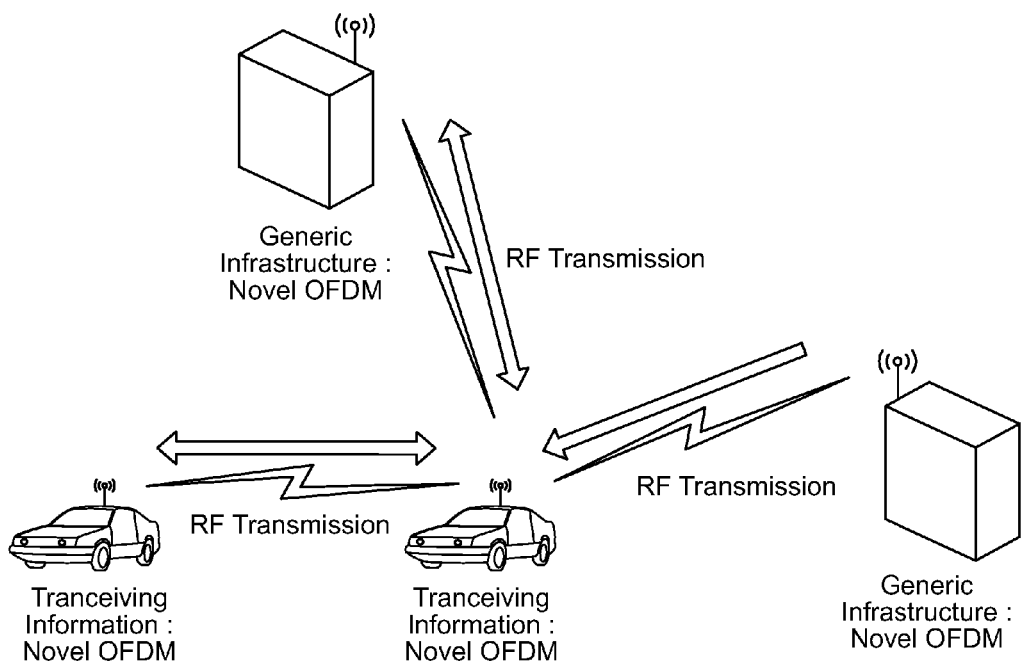
FIG. 17 is a system diagram illustrating an embodiment of uni-directional and bidirectional point-to-point radio communication systems that are built according to the invention.
Figure 18:
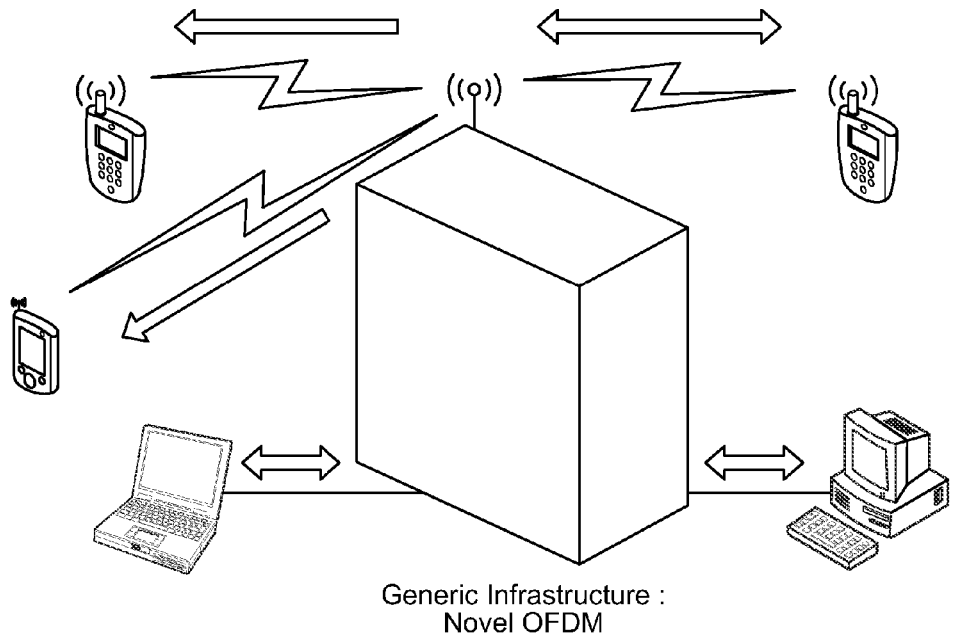
FIG. 18 is a system diagram illustrating an embodiment of a unidirectional and bidirectional generic communication system that is built according to the invention.
Figure 19:
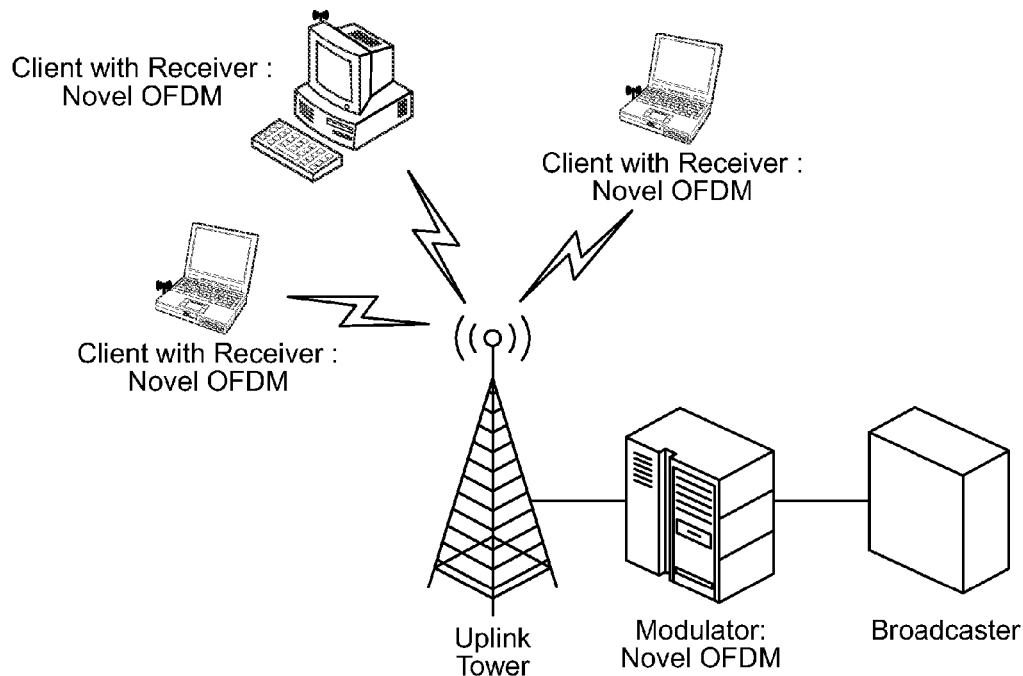
FIG. 19 is a system diagram illustrating an embodiment of a one to many (multicast or one to a selected group of terminals or devices) or broadcast communication system that is built according to the invention.
Figure 20:
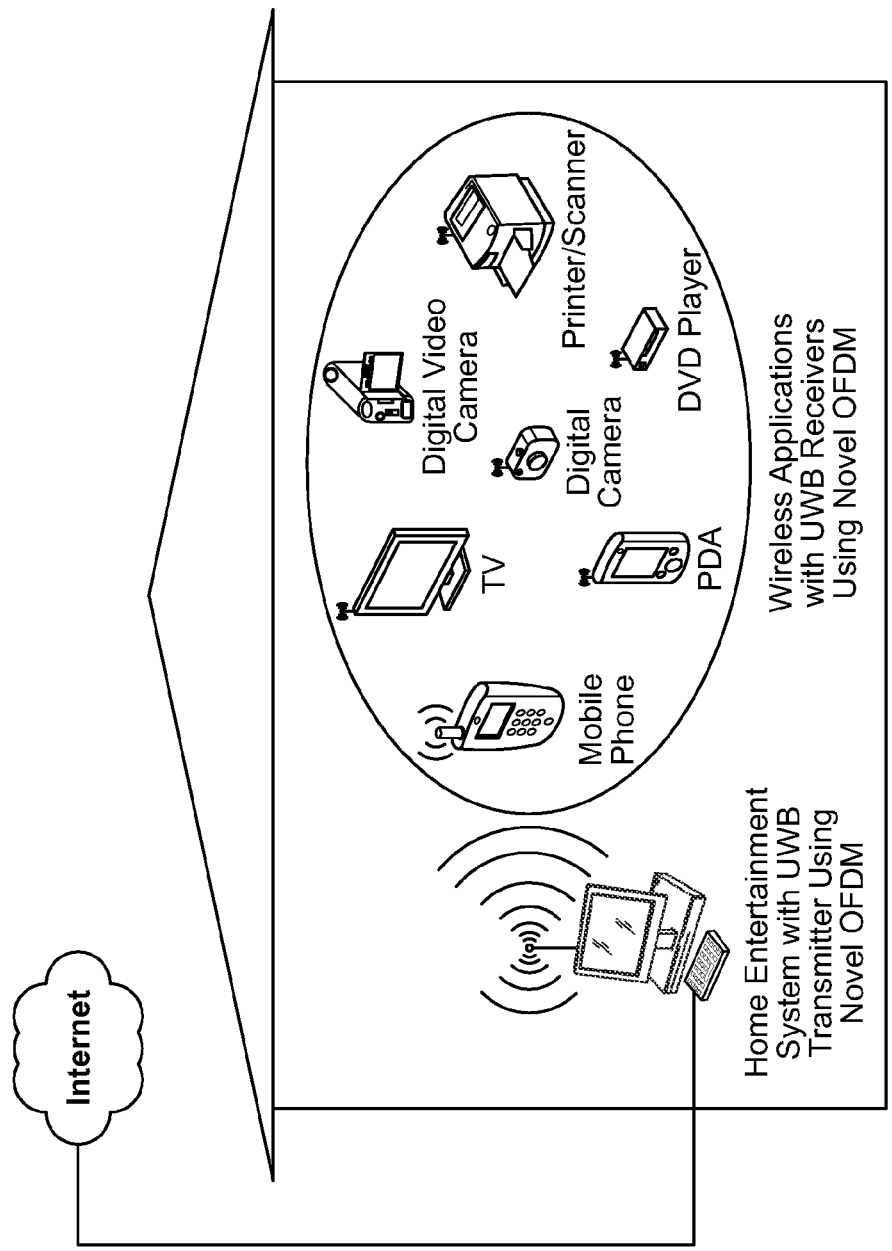
FIG. 20 is a system diagram illustrating an embodiment of UWB (Ultra-wideband) transceiver systems that are built according to the invention.
Figure 21:
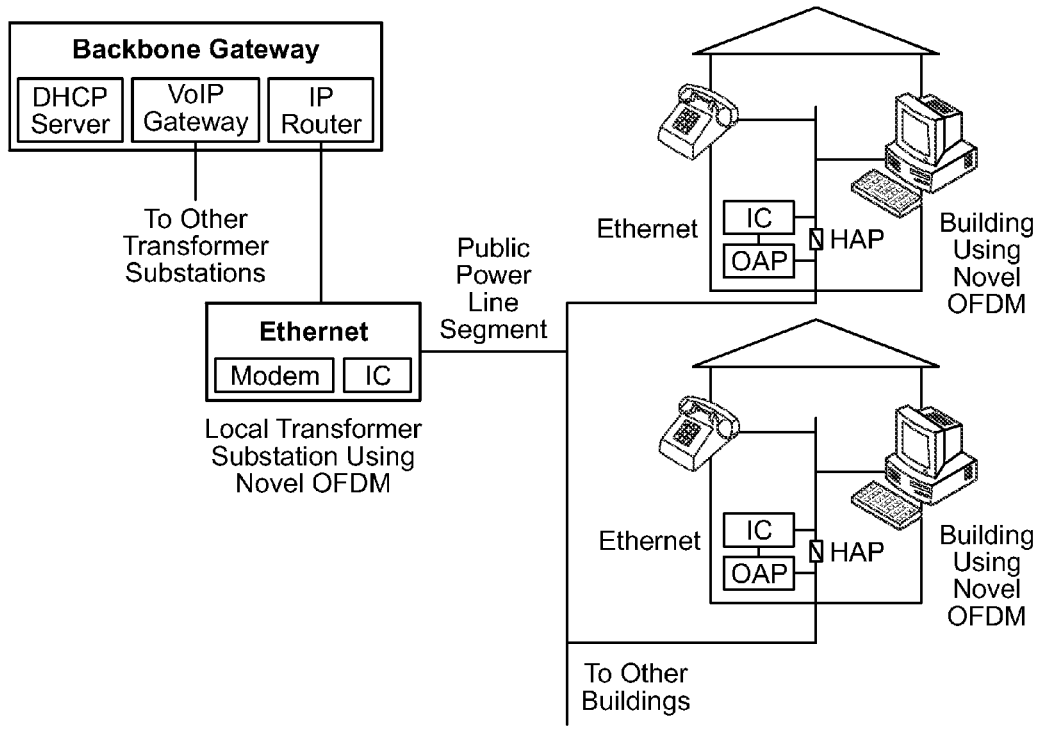
FIG. 21 is a system diagram illustrating an embodiment of an AC Power Line (Alternating Current Power Line) communication system that is built according to the invention.
Figure 22:
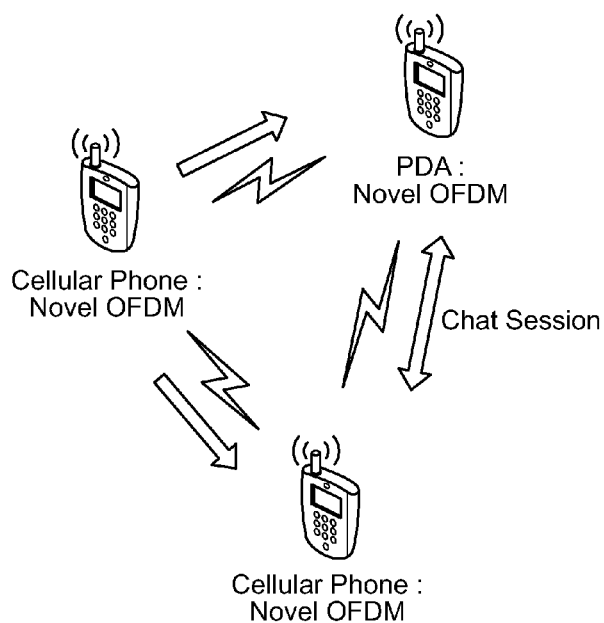
FIG. 22 is a system diagram illustrating an embodiment of a random ad-hoc or mesh network communication system that is built according to the invention.
Figure 23:
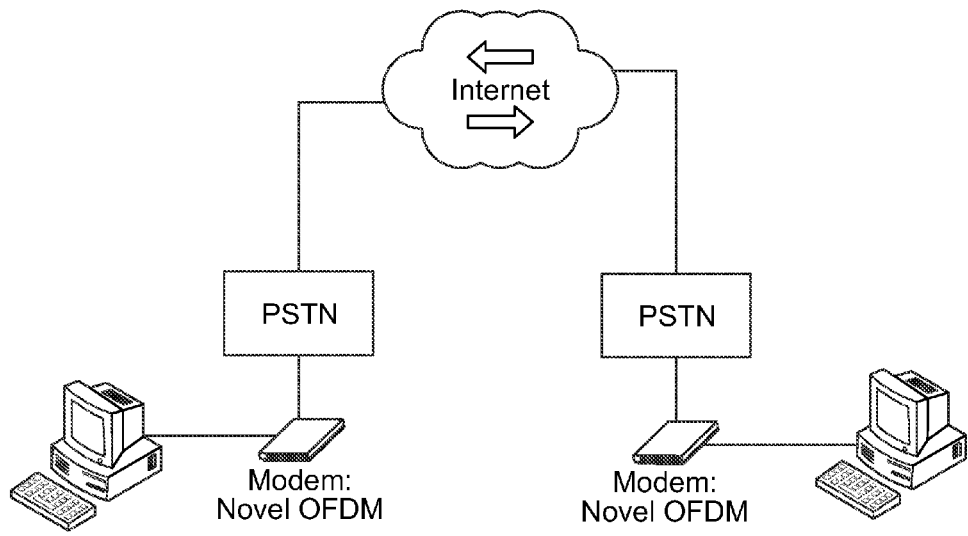
FIG. 23 is a system diagram illustrating an embodiment of a wireline communication system that is built according to the invention.
Figure 24:
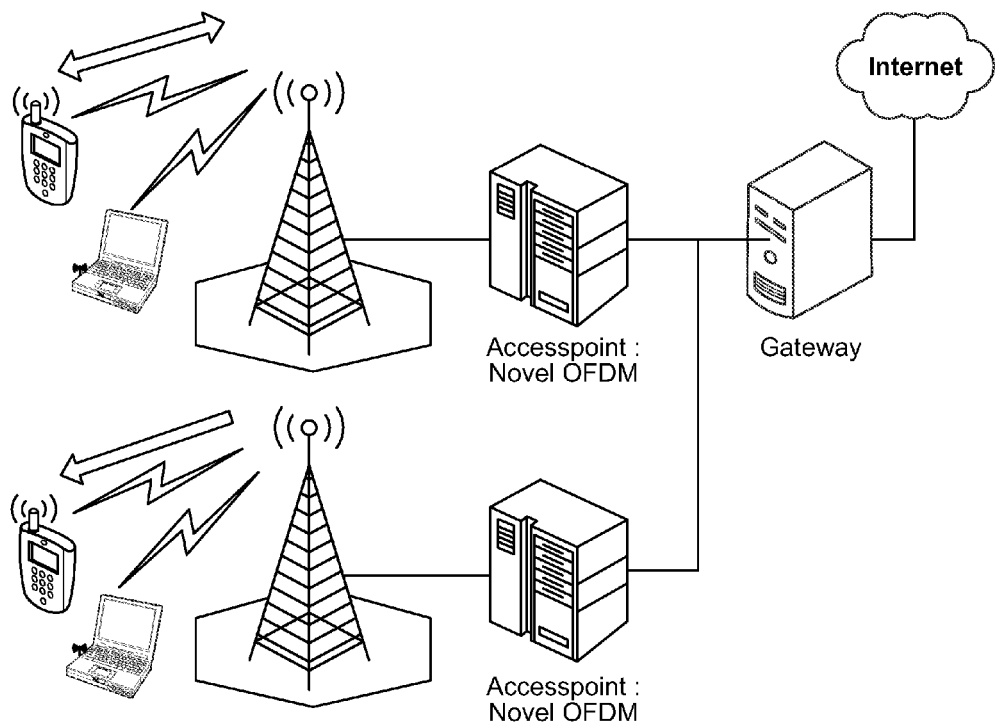
FIG. 24 is a system diagram illustrating an embodiment of a Beyond 3G and/or future cellular communication system that is built according to the invention.

A block diagram of a suboptimal receiver which employs prior art discretization and ML detector 208 (an aspect of this invention) is shown in FIG. 9. The incoming OFDM signal $\tilde{r}(t)$ is filtered through an ideal bandpass filter of equivalent lowpass bandwidth W/2. The filtered signal is sampled using a sample-and-hold (S/H) circuit at time instants $t_n = n\Delta t$, $\Delta t = T_s/N$, to generate the vector r'=(r'[1] ... r'[N]). An N-point discrete Fourier transform (DFT) is performed on the vector r' to obtain the observation vector $y=(y[1] \ldots y[N])^T$. This observation vector is an input to an ML detector.

Expressions for the observables r (for optimal receiver) and y (for suboptimal receiver) are presented for the case of a time-selective, flat-fading channel plus AWGN. We are assuming that $\tilde{r}(t)$ is defined as in (4).

For a time-selective flat-fading channel, $\tilde{y}(t)$ has the form given in (7). The observables for the optimal receiver and suboptimal receiver are specified below.

A. Optimum Receiver Functionality

Define the set of basis functions $\{\phi_k(t)\}_{k=1}^K$, as $$\phi_k(t)=\tilde{\gamma}(t)\phi_k(t), K=N, k=1,\ldots,N \quad (8)$$

where it's assumed that $\tilde{\gamma}(t)$ is known and $\phi_k(t)$ is defined in (1) and (2). Then, projections of $\tilde{r}(t)$ on the basis functions provide the SS for $\tilde{r}(t)$. Note that the set $\{\phi_k(t)\}_{k=1}^K$ is not orthonormal. The orthogonality of the OFDM signal tones at frequencies $f_k=k/T_s$, $k=1,\ldots,N$, is violated due to the time-varying multiplicative random process $\gamma(t)$. This results in ICI (Inter-channel Interference) among the data symbols. The vector of observables is $$r = As + n, \quad (9)$$
where $$A = \sum_{l=1}^L |\gamma_l|^2 A_l, \quad (10)$$

$$[A_l]_{mn} = \int_{(l-1)/L}^{l/L} e^{j2\pi(n-m)\alpha} d\alpha, \quad (11)$$

$$s = \sqrt{2E_b} b, \quad (12)$$

$$\frac{1}{2} E[nn^\dagger] = N_0 A, \quad (13)$$

and $r=(r[1] \ldots r[N])^T$, $s=(s[1] \ldots s[N])^T$, $n=(n[1] \ldots n[N])^T$ is the jointly Gaussian complex noise vector. The covariance matrices $A_l$ are Hermitian and $|\gamma_l|$, $l=1,\ldots,L$, are i.i.d. Rayleigh random variables. Due to the ICI caused by a time-varying channel, the matrix A is not strictly diagonal.

B. Functionality/Implementation Description of the Optimal Discretization Process The discretization process 204 in FIG. 2 performs the following operation to generate the observables r[k], k=1, ..., N:

$$r[k] = \int_0^{T_s} \tilde{r}(t)\varphi_k^*(t) dt, k = 1, \ldots, N. \quad (14)$$

Let $y_k(t)=\tilde{r}(t)\phi^*_k(t)$ and define the sequence $y_{ki}$ as $$\int_{i\Delta t}^{(i+1)\Delta t} y_k(t) dt \approx y_{ki} \Delta t \quad (15)$$

for i=0, 1, ..., n-1 where n-1 is the number of subintervals within $[0, T_s]$ and $\Delta t = T_s/(n-1)$ is the width of the subintervals. Applying a numerical integration rule such as the Trapezoidal Rule to equation (14) gives $$r[k] \approx \frac{\Delta t}{2}[y_{k0} + 2y_{k1} + 2y_{k2} + \ldots + 2y_{k(n-2)} + y_{k(n-1)}], \quad (16)$$

$$k = 1, \ldots, N.$$

The accuracy of the numerical integration increases as the width of the subintervals, $\Delta t$, decreases or equivalently, as the number of subintervals (n-1) increases. The sequence $y_{ki}$, i=0, 1, ..., n-1 can be equivalently writttrn as $$\frac{y_{ki}\Delta t}{2} = a_i e^{-j2\pi f_k i \Delta t}, i = 0, \quad (17)$$

$$y_{ki}\Delta t = a_i e^{-j2\pi f_k i \Delta t}, i = 1, 2, \ldots, n-2, \quad (18)$$

$$\frac{y_{ki}\Delta t}{2} = a_i e^{-j2\pi f_k i \Delta t}, i = n-1, \quad (19)$$

where $$a_i = \frac{1}{2}\int_{i\Delta t}^{(i+1)\Delta t} \frac{\tilde{r}(t)\tilde{\gamma}^*(t)}{\sqrt{T_s}} dt, i = 0, n-1, \quad (20)$$

$$a_i = \int_{i\Delta t}^{(i+1)\Delta t} \frac{\tilde{r}(t)\tilde{\gamma}^*(t)}{\sqrt{T_s}} dt, i = 1, 2, \ldots, n-2. \quad (21)$$

Using definitions from (17) to (19), the sum in (16) can be expressed as $$r[k] \approx \sum_{i=0}^{n-1} a_i e^{-j2\pi f_k i \Delta t} \quad (22)$$

$$= \sum_{i=0}^{n-1} a_i e^{-j(2\pi \Delta t/T_s)ki},$$

$$k = 1, \ldots, N.$$

Equation (22) can be interpreted as the Discrete Fourier Transform of the sequence $a_i$, i=0, 1, ..., n-1 with n>N. Thus, efficient algorithms such as the Fast Fourier Transform, can be employed in part 306 to generate the sufficient statistics r[k], k=1, ..., N as part of the discretization process 204 in FIG. 2 for the optimal receiver 200. Note that this is different from the suboptimal receiver described below which does not generate the sufficient statistics, but merely samples the time continuous function and thereby, throwing away information available in the received OFDM signal.

C. Suboptimum Receiver Functionality

The received waveform $\tilde{r}(t)$, in FIG. 9, is first processed by the suboptimal discretizer 902 to generate a suboptimal set of observables according to the following. The received waveform is ideal bandpass filtered prior to sampling to limit the noise. The equivalent lowpass filter bandwidth is W/2. The FFT is applied to obtain the suboptimal vector of observables y from the discrete time samples. The observables, y, at the output of the suboptimal discretizer 902 of the suboptimal OFDM receiver are given by $$y = \frac{1}{\sqrt{T_s}}\tilde{C}s + n''_w, \quad (23)$$

where $$\frac{1}{2}E[n''_w n''^\dagger_w] = \frac{WN_0}{W_s T_s} I, \quad (24)$$

-continued $$\tilde{C} = \sum_{l=1}^{L} \gamma_l C_l, \quad (25)$$

$$[C_l]_{kq} = \frac{1}{N} \sum_{n=0}^{N-1} \tilde{a}_{n,q}^{(l)} W_N^{n(q-k)}, \quad W_N = e^{j\frac{2\pi}{N}}, \quad (26)$$

$$\tilde{a}_{n,q}^{(l)} = \int_{n/N-l/L}^{n/N-(l-1)/L} \frac{W}{\Delta f} e^{-j2\pi q \alpha} \operatorname{sinc}\left(\frac{W}{\Delta f}\alpha\right) d\alpha, \quad (27)$$

and $W_s = N\Delta f$ is fixed or is not varied.

The resulting ICI is now due to two different and independent causes—bandpass filtering and time variations in the channel.

VIII. ML SOFT-DECISION DETECTOR FUNCTIONALITY

The observation vectors r and y, defined by (9) and (23) respectively, are input to the ML detector. The output is the detected symbol vector with the maximum aposteriori probability (MAP). The A* algorithm [NeRaAu01: P. Nemeth, L. Rasmussen, and T. Aulin, "Maximum-likelihood detection of block coded CDMA using the A* algorithm," in *Proceedings of International Symposium on Information Theory, ISIT 2001*, p. 88, June 2001. This article is incorporated by reference herein in its entirety.] is used to perform an optimal search to determine the optimal path in the tree. The optimal path corresponds to the most likely vector of data symbols (b[1] . . . b[N]) transmitted in the OFDM symbol. To implement the A* algorithm, an appropriate metric and an heuristic function need to be defined for both the optimal and suboptimal OFDM receivers.

A. The A* Algorithm for the Optimal Receiver

The expression (9) for the vector of observables of the optimal OFDM receiver can be simplified to real valued vectors and matrix, i.e. r, s, n∈$R^N$, A∈$R^{N \times N}$, $$r = As + n, \quad (28)$$

where $E[nn^T] = N_0/2 A$. The covariance matrix A is a symmetric and positive definite matrix. The vector of observables (28) can be further transformed in the following way $$F^{-T}r = w = \sqrt{E_b}Fb + n_w, \quad (29)$$

where $A = F^T F$, $E[n_w n_w^T] = N_0/2 I$. Without loss of generality (WLOG) $\sqrt{E_b} = 1$ is assumed. The negative log-likelihood function, $\Lambda(b)$, is defined as $$\Lambda(b) = \|w - Fb\|^2 \quad (30)$$

$$= g_k(n) + h_k(n), 0 \leq k \leq N, \quad (31)$$

where n is the node in the search tree at depth k through which the vector b is passing.

The distance (or cost) from the root node to node n is given by $g_k(n)$. The remaining distance from node n to the last node on the path b is given by $h_k(n)$. The algorithm starts with the root node in a list and terminates when the node to be expanded corresponds to the full N-length path through the search tree. This path specifies the ML vector b which minimized the function $\Lambda(b)$. For every expanded node an evaluation function $f_k(n)$ must be calculated for its successors. Let $h_k^{(e)}(n)$ be the underestimate of the remaining distance $h_k(n)$. The evaluation function $f_k(n)$ for node n is a sum of the current distance $g_k(n)$ and the heuristic function $h_k^{(e)}(n)$ which yields $$f_k(n) = g_k(n) + h_k^{(e)}(n), n = 1, \ldots, 2^N, 0 \leq k \leq N. \quad (32)$$

The algorithm operates with a list of expansion-candidate nodes. At each iteration, the node with the smallest value for its evaluation function will be expanded to yield two child successor nodes as new candidate nodes through which to continue the search. The parent node will be removed from the list and its successors will be inserted in the list.

An appropriate heuristic function remains to be defined. A better heuristic function can significantly reduce the number of nodes searched before the algorithm terminates and returns the ML vector. However, the computational load associated with evaluating the better heuristic function is increased.

A candidate heuristic function to use is one based on constraint minimization techniques, as suggested in [NeRaAu01]. According to [NeRaAu01], the heuristic function can be written as $$h_k(n) = 2q_k(n) + c, 0 \leq k \leq N, \quad (33)$$

where for the given node n at depth k, the quantity c is a constant and can be immediately calculated. Thus, the task of underestimating $h_k(n)$ by a chosen $h_k^{(e)}(n)$ reduces to the task of underestimating $q_k(n)$ by a chosen $q_k^{(e)}(n)$.

Define the notation $u_{(k)} = (u[1] \ldots u[k])$ and $u_{(\bar{k})} = (u[k+1] \ldots u[N])$, $0 \leq k \leq N$. The problem of minimizing $q_k^{(e)}(n)$ is treated as a box-constrained minimization problem: find the (N−k)-length vector $u_{(\bar{k})}$ which lies in the box-constrained set $-a_{(\bar{k})} \leq v_{(\bar{k})} \leq a_{(\bar{k})}$, $a_{(\bar{k})} = \{1\}^{N-k}$, and minimizes $$q_k^{(e)}(n) = \frac{1}{2} v_{(\bar{k})}^T A_{(\bar{k}),(\bar{k})} v_{(\bar{k})} - c^T v_{(\bar{k})}, \quad (34)$$

where $A_{(\bar{k}),(\bar{k})}$ of dimension (N−k)×(N−k) is the submatrix in the bottom right of matrix A in (28) and $$c^T = F_{(\bar{k}),(\bar{k})}^T (w_{(\bar{k})} - F_{(\bar{k}),(k)} b_{(k)}). \quad (35)$$

According to [NeRaAu01], $$u_{(\bar{k})} = \arg \min_{v_{(\bar{k})} \in [-a_{(\bar{k})}, a_{(\bar{k})}]} \frac{1}{2} v_{(\bar{k})}^T A_{(\bar{k}),(\bar{k})} v_{(\bar{k})} - c^T v_{(\bar{k})}, \quad (36)$$

can be found using an iterative algorithm with polynomial complexity. This completes the description of an implementation of the A* algorithm for the optimal OFDM receiver, which is used for generating the numerical results in the next section.

B. The A* Algorithm for the Suboptimal Receiver

For any complex vector x and complex matrix X, define $$\hat{x} = \begin{pmatrix} \operatorname{Re}[x] \\ \operatorname{Im}[x] \end{pmatrix}, \quad (37)$$

$$\hat{X} = \begin{pmatrix} \operatorname{Re}[X] & -\operatorname{Im}[X] \\ \operatorname{Im}[X] & \operatorname{Re}[X] \end{pmatrix}. \quad (38)$$

The expression (23) for the vector of observables of the suboptimal OFDM receiver was derived in the previous section, which implies $$n_w'' = y - \frac{1}{\sqrt{T_s}} \tilde{C} s. \quad (39)$$

Since $n''_w$ is a vector of circularly-symmetric Gaussian random variables where $\frac{1}{2}E[n''_w n''_w{}^\dagger] = WN_0/W_s T_s I$, and assuming that the matrix $\hat{C}$ is non-singular, we can represent (39) in the equivalent form $$\hat{\hat{n}} = \hat{\hat{y}} - \frac{1}{\sqrt{T_s}} \hat{R}\hat{s}. \tag{40}$$

The matrix $\hat{\hat{R}} = \hat{C}^+\hat{C}$ is a positive definite and symmetric $2N \times 2N$ real matrix, $\hat{\hat{n}}$ is a $2N \times 1$ real noise vector with covariance $$E[\hat{\hat{n}}\hat{\hat{n}}^T] = \frac{WN_0}{W_s T_s}\hat{\hat{R}}$$

and $\hat{s}$ is $2N \times 1$ real signal vector.

Equation (28) has the same form as equation (40). Thus, the A* algorithm for the case of the suboptimal receiver can be implemented in the very same way as for the case of the optimal receiver.

IX. APPROXIMATE ML SOFT-DECISION DETECTOR FUNCTIONALITY

FIG. 5 shows an example implementation of the sequence generator 304 for the sequence, $a_i$, i=0, ..., n−1.

The generated sequence, output of the analog integrator 304, is input to the numerical integrator 306 in FIG. 4, which performs the summation operation given by equation (16). The operation in (16) can be implemented using a Fast Fourier Transform as specified in equations (22) and (17) to (21). In Fig. 5. "LPF" means Low Pass Filter.

The received signal vector of sufficient statistics, r, can be modelled as a time-varying finite state machine (FSM). Its linearly transformed version, $w=(F^T)^{-1}r$, given in equation (29), can similarly be modelled as a time-varying FSM, shown in FIG. 6. The superscript "−1" denotes matrix inverse.

For a received OFDM signal with N tones, there are N−1 memory delay elements in its FSM model. The specific values in the N−1 memory delay elements form a numeric sequence, which represent the state of the system or of the FSM. A given unique sequence of values in the N−1 memory elements specifies a unique state.

Figure 6:
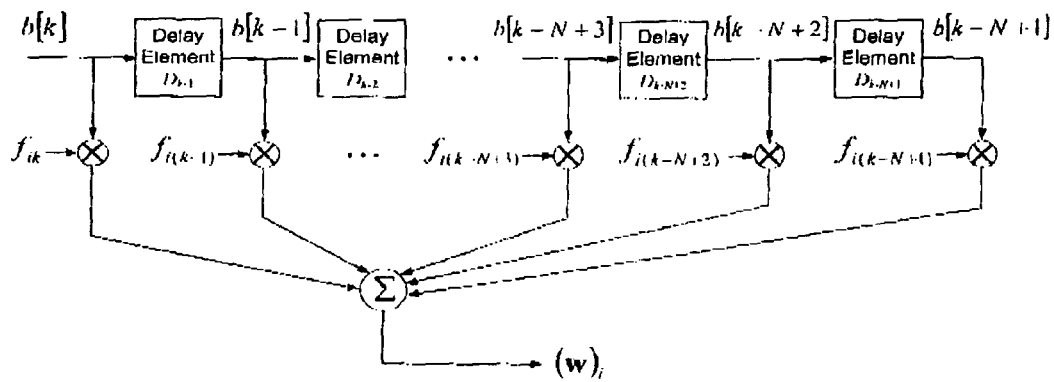
FIG. 6 is a finite-state machine model of the signal part of the received observable in equation (29). The received observable is input to the ML detector 208 shown in FIG. 2.

Let $f_{ik}$ be the matrix element in the $i^{th}$ row and $k^{th}$ column of matrix F in equation (29). In FIG. 6, we associate a multiplier $f_{ik}$ with the delay element, $D_k$, to the left of the multiplier, for k=N−1, N−2, ...1. Define D as the set with the smallest number of memory elements, whose corresponding associated multipliers $f_{ik}$ have magnitudes all greater than those corresponding to memory elements not in the set D and satisfy $$\sum_{k \in D} |f_{1k}|^2 \geq 90\% \sum_{k=1}^{N} |f_{1k}|^2. \tag{41}$$

A memory element in the FSM is considered dominant and if it belongs to the set D.

Figure 7:
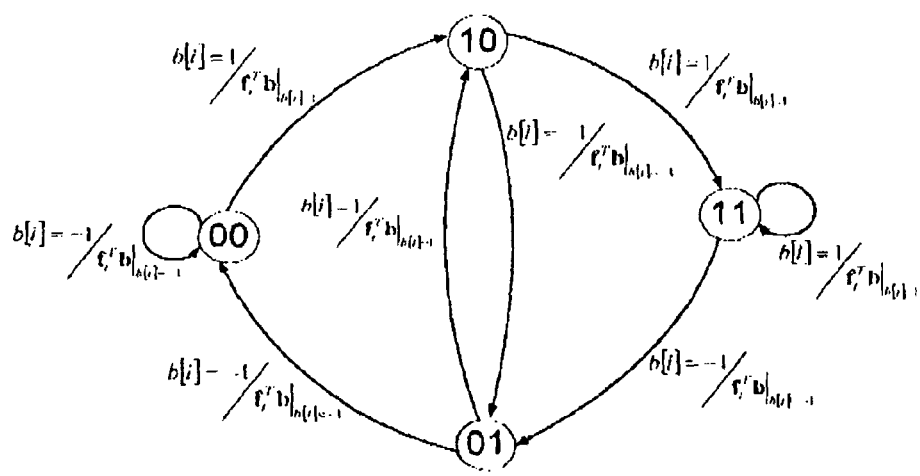
FIG. 7 is a flow graph representation for two dominant memory elements of the finite-state machine model (shown in FIG. 6) of the signal part of the received observable in equation (29).

Let a "state-group" be identified by a unique sequence of values in the dominant memory. elements. A given state belongs to a "state-group" when the given state's corresponding values in the dominant memory elements are the same as those defined for the "state-group". In other words, states can be merged into a "super-state", identified by the specific sequence of values in the dominant memory elements of the FSM. As an example, FIG. 7 shows a flow graph of a FSM with two dominate memory elements, where state sequences of length N−1 are grouped into either one of the four "super-states".

Figure 8:
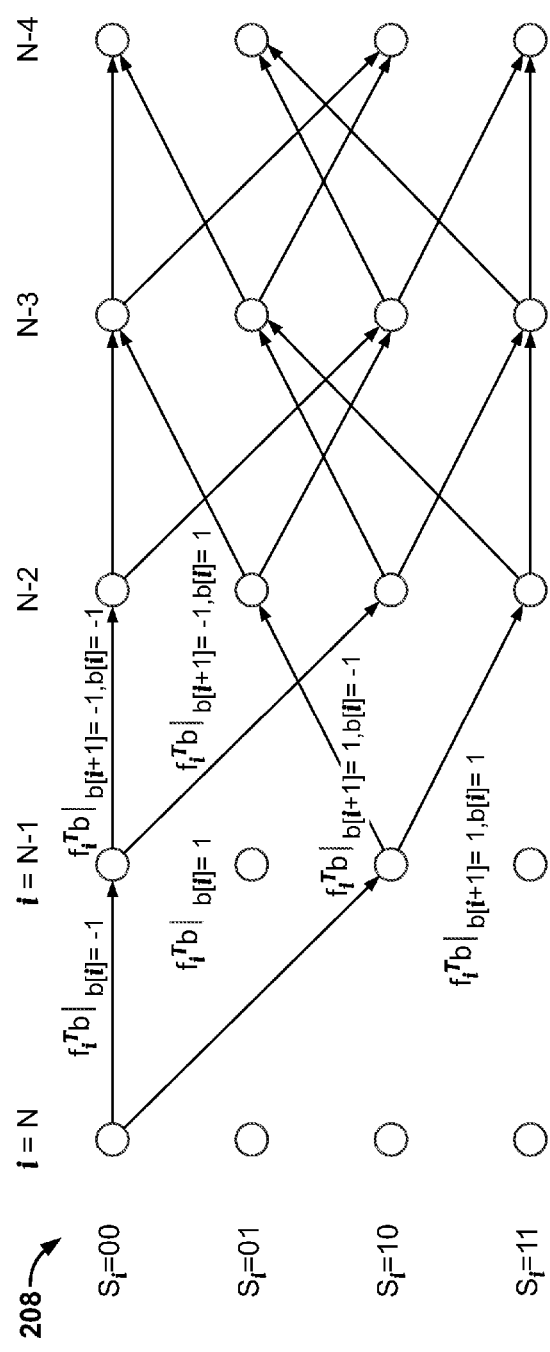
FIG. 8 is a trellis diagram for two dominant memory elements of the finite-state machine model (shown in FIG. 6) of the signal part of the received observable in equation (29). This trellis diagram example illustrates the trellis search algorithm for ML detector 208.

This grouping of states is permissible, results in a near-ML detector with an almost ML symbol error rate performance, and significantly reduces the complexity with respect to the ML detector when the number of dominant FSM memory elements is small. The dominant FSM memory elements with relatively large factors, $|f_{ik}|$ contribute to the significant inter-channel symbol interference. For the $i^{th}$ subchannel, this ICI is present in the observed symbol $(w)_i$, defined as the $i^{th}$ component of vector w in equation (29). FIG. 8 shows an example implementation of an approximate ML sequence detector. In this example, there are two dominant interfering subchannels as modelled by two memory elements giving rise to 4 possible "super-states" for binary signalling. Only the data symbols of the dominant interfering subchannels are used in defining the possible states. State transitions are triggered by the binary input, and the output is a partial sum of the ML metric given in equation (30). At subchannel i=N, possible output metrics are $((w)_i - f_i^T b|_{b[N]=\pm 1})^2$. At subchannel i=N−1, the possible output metrics are $((w)_{i+1} - f_{i+1}^T b|_{b[N]=\pm 1})^2 + ((w)_i - f_i^T b|_{b[N]=\pm 1, b[N-1]=\pm 1})^2$, where as before $(w)_i$ denotes the $i^{th}$ component of vector w, $f_i^T$ denotes the row vector in the $i^{th}$ row of the matrix F, and b is a column vector of transmitted data symbols with components $b[k]=\pm 1$, k=1, ..., N.

X. ADVANTAGES OF DISCLOSED IMPLEMENTATIONS

The structure of an optimal OFDM receiver was compared to that of a suboptimal one in an AWGN channel and in a fast fading channel with AWGN. The structure of both receivers consists of a discretization block, with the time-continuous OFDM signal as the input and a vector of observables as an output, followed by an ML soft-decision detector, implemented using an A* optimal tree-search algorithm. The discretization block 204 for the optimal receiver generates the SS according to the principles of optimum signal detection, while the discretization block 902 for the suboptimum receiver samples the filtered continuous time waveform, followed by FFT to generate the observables which are suboptimal. The time-varying channel was assumed to be known at the receiver. Results show that both optimal and suboptimal systems benefit from the implicit diversity provided by the time variations of the fast fading channel.

Finally, both the optimal and suboptimal receivers have the about the same complexity in terms of implementation. However, the optimal receiver significantly outperforms the suboptimal one.

What is claimed is:

1. A method comprising of receiving a continuous time signal, received over one or more channels,
   multiplying the received continuous time signal with a weighting function from a set of weighting functions;
   integrating the product of the received continuous time signal and the weighting function over a subinterval whose duration is a fraction of the transmission interval of an OFDM (Orthogonal Frequency Division Multiplexed) data symbol;
   performing integrations for subsequent subintervals;

performing a plurality of weighted sums of the outputs of subinterval integrations, using a plurality of sets of coefficients to give a plurality of observables which are used to detect symbols to recover data from the continuous time signal.

2. A method comprising of receiving continuous time Orthogonal Frequency Division Multiplexed (OFDM) signals, received over one or more channels,
   multiplying each received continuous time signal with a weighting function from a set of weighting functions;
   integrating the product of each received continuous time signal and weighting function over a subinterval whose duration is a fraction of the transmission interval of an OFDM data symbol;
   performing integrations for subsequent subintervals;
   performing a plurality of weighted sums of the outputs of subinterval integrations, using a plurality of sets of coefficients to give a plurality of observables;
   using these observables which contain channel information contained in continuous time signals and detecting one or more symbol sequences from a set of candidate symbol sequences and using the detected symbols to recover data from the continuous time signals.

3. The method in claims 1 or 2 wherein one or more channels include tetherless, or tethered, or wireless, or wireline, or fading, or multipath channels.

4. The method in claims 1 or 2 in which the weighting functions comprise of: a plurality of realizations of the multiplicative process introduced by one or more channels.

5. The method in claims 1 or 2 in which the weighting functions are estimates of the multiplicative process introduced by one or more channels.

6. The method in claims 1 or 2, in which the integration process employs a single or multiple parallel integrate and dump filters to perform integration operations to generate a given observable or a set of observables respectively.

7. The method in claims 1 or 2 further comprising in which:
   the outputs of the integration operations are used to compute weighted sums to yield one or more observables, and where the weight coefficients used in computing the weighted sums are derived from basis functions of one or more transmitted or received continuous time signals over one or more channels;
   and where the weighted sums are each a projection of the outputs of the integration operations onto a weight coefficient vector, whose components are derived from basis functions of one or more transmitted or received continuous time signals over one or more channels.

8. The method in claims 1 or 2 in which the set of weight coefficient vectors, derived from basis functions of one or more transmitted or received continuous time signals, can be mutually independent.

9. The method in claims 1 or 2 in which
   the derived set of observables is a set of sufficient statistics;
   the derived set of observables capture time variations, caused by one or more channels or by one or more fading channels, in one or more received continuous time signals.

10. The method in claims 1 or 2 in which an A* tree search algorithm or Maximum Likelihood (ML) detector is used to detect the symbol sequence which minimizes the metric defined as the negative log-likelihood function.

11. The method in claims 1 or 2 in which one or more continuous time signals are received by a plurality of communication nodes, and further comprises communication nodes that receive, coordinate and jointly demodulate one or more continuous time signals.

12. The method of claim 2 further comprising where the set of observables generated is based on operations given by equations:

$$r[k] = \sum_{i=0}^{n-1} a_i e^{-j2\pi f_k i \Delta t}, \quad (22)$$

where $$\frac{y_{ki} \Delta t}{2} \approx a_i e^{-j2\pi f_k i \Delta t}, \, i = 0, \quad (17)$$

$$y_{ki} \Delta t \approx a_i e^{-j2\pi f_k i \Delta t}, \, i = 1, 2, \ldots, n-2, \quad (18)$$

$$\frac{y_{ki} \Delta t}{2} \approx a_i e^{-j2\pi f_k i \Delta t}, \, i = n-1, \quad (19)$$

and where $$a_i = \frac{1}{2} \int_{i\Delta t}^{(i+1)\Delta t} \frac{\tilde{r}(t) \tilde{\gamma}^*(t)}{\sqrt{T_s}} dt, \, i = 0, n-1, \quad (20)$$

$$a_i = \int_{i\Delta t}^{(i+1)\Delta t} \frac{\tilde{r}(t) \tilde{\gamma}^*(t)}{\sqrt{T_s}} dt, \, i = 1, 2, \ldots, n-2, \quad (21)$$

and where parameter, $f_k$, is a frequency value of the $k^{th}$ OFDM signal tone, parameter, $\Delta t$, gives an interval or subinterval of time, function $\tilde{r}(t)$ is complex envelope of received continuous time signal, function $\gamma(t)$ is a multiplicative process introduced by one more channels, and parameter, $T_s$, is an OFDM symbol duration.

13. The method of claim 12 in which using the set of observables to detect one or more symbol sequences from a set of candidate sequences further comprises:
   transforming a sequence of observables r[k] to a real-valued vector r;
   determining Cholesky decomposition for covariance matrix A in the equation below $$r = As + n, \quad (28)$$

where n is noise, and $$A = F^T F;$$

transforming the real-valued vector or observables, using the inverse of the left matrix, $(F^T)^{-1}$, of Cholesky decomposition, $F^T F$ of A, such that the resultant transformed noise vector, $(F^T)^{-1} n$, has a diagonal covariance matrix;
   computing negative log-likelihood function using the transformed real-valued vector of observables and using the negative log-likelihood function as a metric;
   select the symbol sequence which minimizes the metric as the transmitted symbol sequence.

14. The method in claim 13, in which the observables are represented as a time-varying finite state machine to define states of the method; and in which the method comprising further using the totality or all the states, or a subset of states, or a reduced set of states wherein two or more states are merged to obtain a reduced set of states, of the time-varying finite state machine to perform a trellis search to detect the symbol sequence which minimizes the metric defined as the negative log-likelihood function.

15. A non-transitory computer-readable medium having stored thereon instructions, which, when executed by a processor, causes the processor to perform operations comprising:
   receiving one or more continuous time signals, received over one or more channels, multiplying each received continuous time signal with a weighting function from a set of weighting, functions;

integrating the product of each received continuous time signal and weighting function over a subinterval whose duration is a fraction of the transmission interval of an OFDM (Orthogonal Frequency Division Multiplexed) data symbol;

performing integrations for subsequent subintervals;

performing a plurality of weighted sums of the outputs of subinterval integrations, using a plurality of sets of coefficients to give a plurality of observables;

and using the observables to detect one or more symbols to recover data from one or more continuous time signals.

16. A non-transitory computer-readable medium in claim 15, having stored thereon instructions, which, when executed by a processor, causes the processor to perform operations further comprising of:

using those observables which contain channel information contained in one or more received continuous time signals, received over one or more channels, and detecting one or more symbol sequences from a set of candidate symbol sequences and using the detected symbols to recover data from one or more continuous time signals.

17. The non-transitory computer-readable medium in claim 15 in which the derived set of observables is a set of sufficient statistics;

the derived set of observables capture time variations, caused by one or more channels or by one or more fading channels, in one or more received continuous time signals.

18. A system comprising a number of modules; one or more modules receiving one or more continuous time signals, received over one or more channels; one or more modules multiplying each received continuous time signal with a weighting function from a set of weighting functions;

one or more modules integrating the product of each received continuous time signal and the weighting function over a subinterval whose duration is a fraction of the transmission interval of an OFDM (Orthogonal Frequency Division Multiplexed) data symbol;

one or more modules performing integrations for subsequent subintervals;

one or more modules performing a plurality of weighted sums of the outputs of subinterval integrations, using a plurality of sets of coefficients to give a plurality of observables which are used by one or more modules to detect symbols to recover data from one or more continuous time signals.

19. The system in claim 18 which further comprises of a device using these observables which contain channel information contained in one or more continuous time signals, received over one or more channels, and detecting one or more symbol sequences from a set of candidate symbol sequences and using the detected symbols to recover data from one or more continuous time signals.

20. The system in claim 18 in which the weighting functions are estimates of the multiplicative process introduced by one or more channels.

21. The system in claim 18 in which the integration process employs a single or multiple parallel integrate and dump filters to perform integration operations to generate a given observable or a set of observables respectively.

22. The system in claim 18 further comprising in which:

the outputs of the integration operations are used to compute weighted sums to yield one or more observables, and where weight coefficients used in computing the weighted sums are derived from basis functions of one or more transmitted or received continuous time signals over one or more channels;

the weighted sums are each a projection of the outputs of the integration operations onto a weight coefficient vector, whose components are derived from basis functions of one or more transmitted or received continuous time signals over one or more channels.

23. The system in claim 18 in which the derived set of observables is a set of sufficient statistics;

the derived set of observables capture time variations, caused by one or more channels or by one or more fading channels, in one or more received continuous time signals.

24. The system in claim 18 further comprising of where the set of observables generated is based on operations given by equations:

$$r[k] = \sum_{i=0}^{n-1} a_i e^{-j2\pi f_k i \Delta t}, \quad (22)$$

where $$\frac{y_{ki} \Delta t}{2} \approx a_i e^{-j2\pi f_k i \Delta t}, \, i = 0, \quad (17)$$

$$y_{ki} \Delta t \approx a_i e^{-j2\pi f_k i \Delta t}, \, i = 1, 2, \ldots, n-2, \quad (18)$$

$$\frac{y_{ki} \Delta t}{2} \approx a_i e^{-j2\pi f_k i \Delta t}, \, i = n-1, \quad (19)$$

and where $$a_i = \frac{1}{2} \int_{i\Delta t}^{(i+1)\Delta t} \frac{\tilde{r}(t)\tilde{\gamma}^*(t)}{\sqrt{T_s}} dt, \, i = 0, n-1, \quad (20)$$

$$a_i = \int_{i\Delta t}^{(i+1)\Delta t} \frac{\tilde{r}(t)\tilde{\gamma}^*(t)}{\sqrt{T_s}} dt, \, i = 1, 2, \ldots, n-2, \quad (21)$$

and where parameter, $f_k$, is a frequency value of the $k^{th}$ OFDM signal tone, parameter, $\Delta t$, gives an interval or subinterval of time, function $\tilde{r}(t)$ is complex envelope of received continuous time signal, function $\tilde{\gamma}(t)$ is a multiplicative process introduced by one or more channels, and parameter, $T_s$, is an OFDM symbol duration.

25. The system in claim 18 in which using the set of observables to detect one or more symbol sequences from a set of candidate sequences further comprise:

transforming a sequence of observables to a real-valued vector r;

determining Cholesky decomposition for covariance matrix A in the equation below $$r = As + n, \quad (28)$$

where n is noise, and $$A = F^T F;$$

transforming the real-valued vector of observables, using the inverse of the left matrix, $(F^T)^{-1}$, of Cholesky decomposition, $F^T$ of A, such that the resultant transformed noise vector, $(F^T)^{-1} n$, has a diagonal covariance matrix;

computing negative log-likelihood function using the transformed real-valued vector of observables and using the negative log-likelihood function as a metric;

select the symbol sequence which minimizes the metric as the transmitted symbol sequence.

26. The system in claim 18 in which the observables are represented as a time-varying finite state machine to define the states of the system; and in which one or more modules comprising further using the totality of all the states, or a subset of states, or a reduced set of states wherein two or more states are merged to obtain a reduced set of states, of the time-varying finite state machine to perform a trellis search to detect the symbol sequence which minimizes the metric defined as the negative log-likelihood function.

27. The system in claim 18 in which un A* tree search algorithm or Maximum Likelihood (ML) detector is used to detect the symbol sequence which minimizes the metric defined as the log-likelihood function.

* * * * *